US011388567B1

(12) United States Patent
McCracken, Jr. et al.

(10) Patent No.: US 11,388,567 B1
(45) Date of Patent: Jul. 12, 2022

(54) PRE-LOADED MOBILE COMMUNICATION DEVICE CUSTOMIZATION MANIFEST

(71) Applicant: T-Mobile Innovations LLC, Overland Park, KS (US)

(72) Inventors: Billy G. McCracken, Jr., Lenexa, KS (US); Hannah J. Sifuentes, Lee's Summit, MO (US); Anurag Thantharate, Overland Park, KS (US)

(73) Assignee: Sprint Communications Company LP, Overland Park, KS (US)

( * ) Notice: Subject to any disclaimer, the term of this patent is extended or adjusted under 35 U.S.C. 154(b) by 0 days.

(21) Appl. No.: 17/183,217

(22) Filed: Feb. 23, 2021

(51) Int. Cl.
*H04W 8/18* (2009.01)
*H04W 4/50* (2018.01)
*H04W 88/02* (2009.01)

(52) U.S. Cl.
CPC ............. *H04W 4/50* (2018.02); *H04W 8/183* (2013.01); *H04W 88/02* (2013.01)

(58) Field of Classification Search
CPC ........ H04W 4/50; H04W 8/183; H04W 88/02
See application file for complete search history.

(56) References Cited

U.S. PATENT DOCUMENTS

| 9,092,291 B1* | 7/2015 | Adib ....................... G06F 9/451 |
| 9,098,366 B1 | 8/2015 | Adib et al. |
| 9,871,905 B1 | 1/2018 | Habiger et al. |
| 2012/0208534 A1* | 8/2012 | Swaminathan ....... H04W 8/183 455/434 |

\* cited by examiner

*Primary Examiner* — Joseph E Dean, Jr.

(57) ABSTRACT

A mobile communication device that customizes a user interface of the mobile communication device based on a pre-loaded customization manifest. The device comprises a processor; a non-transitory memory; and a customization application stored in the non-transitory memory, wherein the customization application comprises data defining a plurality of customization manifests and comprises instructions that, when executed by the processor, determines that a universal integrated circuit card (UICC) has been installed, reads identity information from the UICC, wherein the identity information is associated with a wireless communication service provider, based on the identity information, selects a customization manifest that is one of the plurality of customization manifests, and writes at least some of the contents of the selected customization manifest into non-volatile (NV) parameters in the non-transitory memory, whereby a user interface of the mobile communication device is customized for use with the wireless communication service provider.

20 Claims, 9 Drawing Sheets

PRE-LOADED MOBILE COMMUNICATION DEVICE CUSTOMIZATION MANIFEST

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may establish wireless communication links with cell sites based on network access keys and identifying information stored in a universal integrated circuit card (UICC) or SIM card installed into the device. A first UICC associated with a first wireless communication service provider may be removed from a mobile communication device and a second UICC associated with a second wireless communication service provider may be installed in the mobile communication device to change a subscriber's service provider.

SUMMARY

In an embodiment, a mobile communication device that updates wireless communication service provider customization data without maintenance releases and avoids a security risk of granting a temporary communication link for wirelessly downloading customization data in association with a newly installed wireless profile before validating a wireless communication service provider associated with the new wireless profile is disclosed. The device comprises a radio transceiver, a processor, a non-transitory memory, an application installer stored in a system portion of the non-transitory memory that, when executed by the processor, automatically downloads updates of applications and installs the updated applications on the mobile communication device, and a customization application updated by the application installer and stored in the system portion of the non-transitory memory, wherein the customization application comprises data defining a plurality of customization manifests and comprises instructions. When executed by the processor, the customization application determines that a first universal integrated circuit card (UICC) has been installed in the mobile communication device, reads first identity information from the first UICC, wherein the first identity information is associated with a first wireless communication service provider, based on the first identity information, and looks up a first customization manifest that is one of the plurality of customization manifests. The customization application writes at least some of the contents of the first customization manifest into non-volatile (NV) parameters in the non-transitory memory, whereby a user interface of the mobile communication device is customized for use with the first wireless communication service provider and initiates a wireless link to a cell site via the radio transceiver to complete wireless communication service provisioning with the first wireless communication service provider based in part on the NV parameters. The customization application further determines that a second UICC has been installed in the mobile communication device, reads second identity information from the second UICC, wherein the second identity information is associated with a second wireless communication service provider, and based on the second identity information, determines that the second wireless communication service provider is unsupported, whereby granting a temporary communication link to the second wireless communication service provider is avoided.

In another embodiment, a method of customizing a mobile communication device is disclosed. The method comprises determining by an application installer executing on a mobile communication device that an update of a customization application is available, downloading a customization application update by the application installer, wherein the customization application update comprises a new customization manifest associated with a wireless communication service provider and wherein the new customization manifest defines customization data associated with the wireless communication service provider, and installing the customization application update by the application installer in a system portion of a non-volatile memory of the mobile communication device. The method further comprises determining by the updated customization application executing on the mobile communication device that a universal integrated circuit card (UICC) has been installed, wherein the updated customization application comprises a plurality of customization manifests among which is the new customization manifest and, in response to determining that a UICC has been installed, reading identity information from the UICC by the updated customization application, wherein the identity information is associated with the wireless communication service provider associated with the new customization manifest. The method further comprises, based on the identity information, selecting the new customization manifest by the updated customization application from the plurality of customization manifests, writing at least some of the contents of the new customization manifest by the updated customization application into non-volatile (NV) parameters in the mobile communication device, whereby a user interface of the mobile communication device is customized for use with the wireless communication service provider, and after writing to the NV parameters, initiating wireless communication service provisioning by the mobile communication device with the wireless communication service provider associated with the new customization manifest.

In yet another embodiment, a mobile communication device that customizes a user interface of the mobile communication device based on a pre-loaded customization manifest is disclosed. The device comprises a processor, a non-transitory memory, and a customization application stored in the non-transitory memory. The customization application comprises data defining a plurality of customization manifests and comprises instructions. When executed by the processor, the customization application determines that a universal integrated circuit card (UICC) has been installed in the mobile communication device, reads identity information from the UICC, wherein the identity information is associated with a wireless communication service provider, and, based on the identity information, selects a customization manifest that is one of the plurality of customization manifests. The customization application further writes at least some of the contents of the selected customization manifest into non-volatile (NV) parameters in the non-transitory memory, whereby a user interface of the mobile communication device is customized for use with the wireless communication service provider and, after writing some of the contents of the selected customization manifest into NV parameters, completes wireless communication service provisioning with the wireless communication service provider based in part on the NV parameters.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
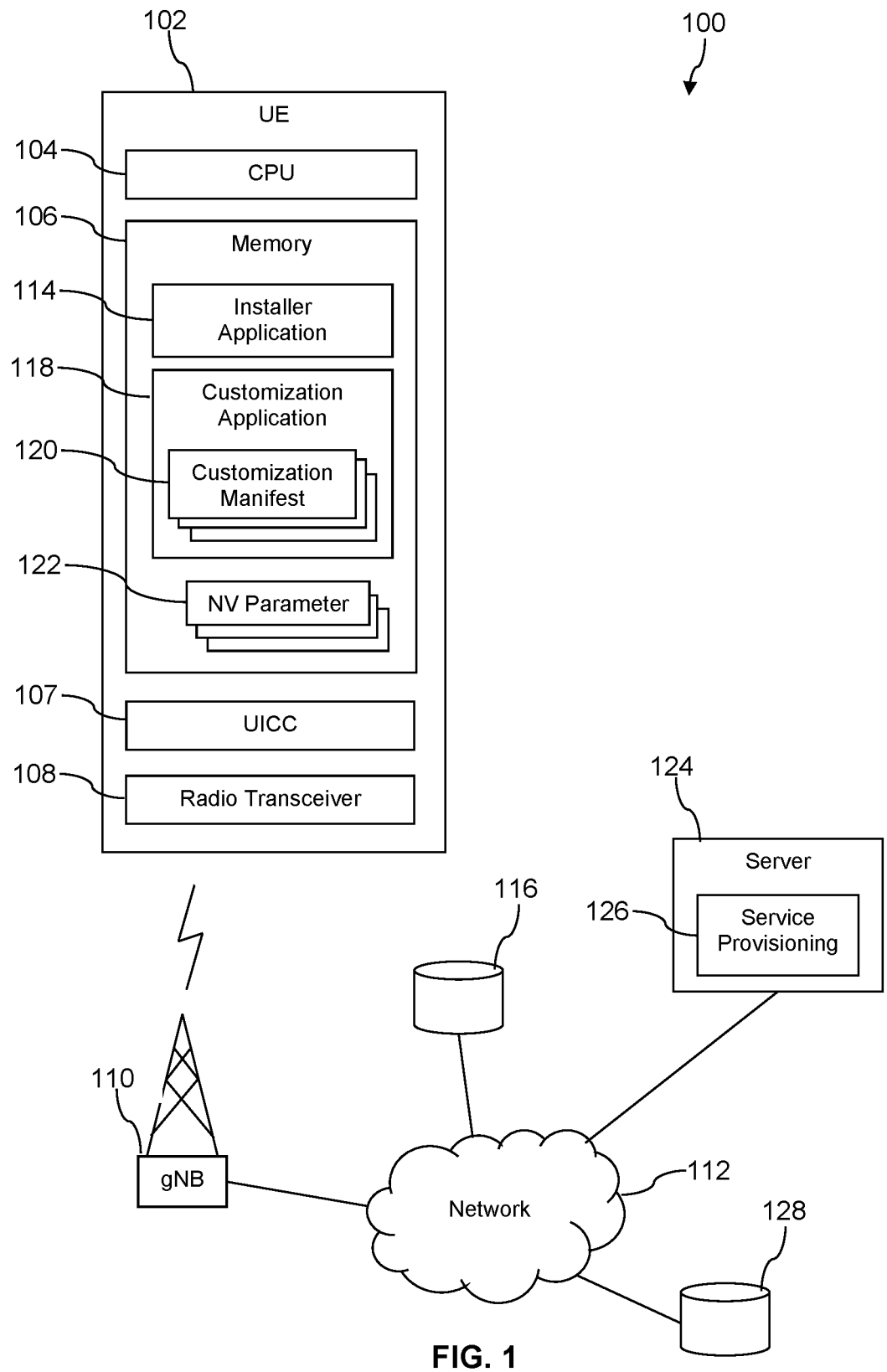
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user equipment (UE) may be pre-loaded with a customization application that comprises a plurality of manifest files. In some contexts, the plurality of manifest files may be referred to as pre-loaded manifest files. Each manifest file may define customizations of the UE for a specific mobile virtual network operator (MVNO). When executed by the UE, the customization application can select an appropriate manifest file and customize the UE using the selected manifest file. The customizations may define ring tones, a power-on video, a power-off video, logos, a home screen, a wallpaper, a background theme, an MVNO home page, carrier applications, roaming plans, email boxes, and/or voicemail boxes. These manifest files may be in XML format and contain all the customizations and graphics desired. The manifest files may be indexed or referenced by MVNO names and/or by access point networks (APNs) that each associate to a particular MVNO.

When a new universal integrated circuit card (UICC) or subscriber identity module (SIM) card is installed in the UE, the customization application can determine that a new UICC/SIM is installed, read an MVNO name and/or APN defined by the UICC/SIM, use the MVNO name and/or APN to index into the manifest files to select a manifest file corresponding to the MVNO, and then customize the UE based on the contents of the selected manifest file. In an embodiment, logic in the customization application would execute that would find the manifest file that matches to the APN, extract the XLM of that manifest file, and configure the appropriate customizations on the UE without having to reach out to the wireless network to obtain these customizations. In some cases, some additional customization may occur as a second step, for example after the UE has completed initial customizations and reaches out via a wireless communication link to a cell site to complete service provisioning via a network connection.

The customization application and the customization process disclosed herein provides several benefits and provides at least one particular technical solution to a technical problem. The UE completing at least a first phase of customizations by executing the customization application before reaching out to the wireless network can provide a more seamless user experience. The user need not experience a first generic look and feel that is later replaced by a second particular look and feel that is different, as is common for other customization processes. This may be viewed by a user as a hiccup, a hitch in the initiation process. This perceived hiccup may create a negative impression of the MVNO in the user. Additionally, in an embodiment, by executing the customization application to perform customization the UE may avoid a reboot cycle which a user may see as a nuisance in the customization process disclosed herein. This streamlined user experience may be deemed a first benefit, based on the customization application providing a first particular solution to the technical problem of customizing the UE while providing a clean user experience.

A second benefit can be increased security of the wireless network, in that the customization application can block a UE having a UICC associated with an unaffiliated and/or an unapproved MVNO installed from establishing an initial wireless link with a cell site. In the past, customization might involve the UE first establishing an initial wireless link to a cell site in a provisional mode of operation whereby to access a provisioning server and/or a customizing server in the network to complete provisioning and/or customization of the UE. While operating in such a provisional mode of operation, the UE might be restricted to access only specifically listed network domains that support provisioning and customization processes. These restricted network domains may be referred to as a "walled garden" in some contexts. After completion of this network-based provisioning and/or customization, the UE could reestablish a new wireless link in a conventional mode of operation (e.g., NOT in the provisional mode of operation) using network access credentials downloaded to the UE during the provisioning and/or customization process. But in this traditional network-based customization process, the UE receives a wireless link and access into the network, even if only a restricted portion of the network, notwithstanding that the UE may have an unaffiliated or an unapproved UICC installed, for example a UICC associated with an MVNO that has not been approved for access to the network or has been banned from access to the network. Thus, this traditional network-based customization process may pose security risks, because once inside the network, even in the restricted portion of the network, the UE with an unapproved UICC might subvert the network in some way.

The customization application disclosed herein can block any attempt by the UE accessing the network, even in a restricted access mode, when the UICC installed in the UE does not identify an MVNO or an APN that is pre-defined in the customization application (e.g., defined as an index or reference into the manifest files). In the customization process described herein, the customization application can validate the MVNO identity, the APN, or an identity of the UICC before the UE connects to the wireless network. If the APN, the MVNO identity, or identity of the UICC does not pass this validation process (e.g., this UICC is associated with a non-approved MVNO), the customization application can stop the customization process before the UE ever attempts to attach to the radio access network, providing significant security benefit. This security provision can be deemed a second benefit, based on the customization application providing a second particular technical solution to the technical problem of avoiding exposing the network to security risks.

A third benefit can be reduction of overhead traffic burdens on the communication network and increasing operating efficiency. By the customization application blocking and thereby avoiding even restricted network usage by UEs associated with an unaffiliated or banned MVNO, overall overhead traffic burden on the network is reduced. Additionally, in time, as the solution described herein to UE customization is deployed fully, it would be possible to decommission the network resources that support the "walled garden" environment for customization described above. These decommissioned network resources could be repurposed to supporting other network processing needs. This can avoid capital expense for buying additional servers to support growing network traffic and/or can reduce leasing of third-party cloud computing resources. This reduced overhead traffic burden on the communication network and increased operating efficiency can be deemed a third benefit, based on the customization application providing a third technical solution to the technical problem of decreasing burden on the network and increasing operating efficiency.

A fourth benefit can be ease of extending the functionality of the customization application, for example by adding an additional customization manifest to the customization application without necessitating the inconvenience and expense of a maintenance release. The customization application and customization process disclosed herein supports ease of extending the set of MVNOs that the UE works with. When a new MVNO is added, the customization application may be updated and stored on an application data store in the network. The updated customization application can comprise a new manifest file associated with the newly affiliated and/or approved MVNO and comprising an index from an MVNO identity or APN associated with the MVNO to the new manifest file. An application installer executing on the UE can detect that an update of the customization application is available from the application data store, can download the customization application update, and install the customization application update into the UE. In the past, such updates might have involved a maintenance release that required the engagement of the original equipment manufacturer (OEM) of the UE. The customization application disclosed herein can be updated by the application installer without the need for a maintenance release. In an embodiment, both the application installer and the customization application are stored in a system partition of non-transitory memory of the UE. Access to this system partition may be restricted so that users may not initiate updates of anything stored in the system partition, but a "system application" (e.g., an application installed in the system portion of memory) such as the application installer can update the customization application that is stored in the system partition. This update mechanism can be deemed a fourth benefit, based on the customization application and application installer providing a fourth particular technical solution to the technical problem of avoiding a maintenance release.

While spoken of as a first, second, third, and fourth particular technical solution, it can equally be said that one integrated particular technical solution provides a solution for each of four distinct and different technical problems. Said in other words, four birds are killed with one stone—four technical problems are solved with a single technical innovation.

Turning now to FIG. 1, a communication system 100 is described. In an embodiment, the system 100 comprises a user equipment (UE) 102 that has a processor 104, a memory 106, a universal integrated circuit card (UICC) 107, and a radio transceiver 108. The UE 102 may establish a wireless communication link between the radio transceiver 108 and a cell site 110 based on network access credentials read from the UICC 107. The cell site 110 may communicatively couple the UE 102 to a network 112 and to other electronic devices communicatively coupled to the network 112. In an embodiment the UE 102 is a mobile phone, a smart phone, a personal digital assistant (PDA), a wearable computer, a headset computer, a laptop computer, a tablet computer, a notebook computer, or an Internet of things (IoT) device. In some context, the UE 102 may be referred to as a mobile communication device. The network 112 comprises one or more public networks, one or more private networks, or a combination thereof. The radio transceiver 108 may communicate with the cell site 110 according to a 5G, a long-term evolution (LTE), a code division multiple access (CDMA), or a global system for mobile communications (GSM) telecommunication protocol.

The memory 106 stores an installer application 114. The installer application 114 may be executed by the processor 104. The installer application 114 may communicate with an application data store 116 via the radio transceiver, the cell site 110, and the network 112. The installer application 114 may periodically check the application data store 116 to determine if any applications stored on the UE 102 are associated with an updated application version stored in the application data store 116. If the installer application 114 identifies an updated application in the application data store 116 that corresponds to an older application installed in the memory 106, the installer application 114 may download the updated application from the application data store 116 and install it in the place of the older application in the memory 106. In an embodiment, the memory 106 stores a customization application 118 that comprises a plurality of customization manifests 120. In an embodiment, the customization manifests 120 may be stored in the memory 106 outside of the customization application 118 but be accessible to the customization application 118.

In an embodiment, an updated customization application is built by adding one or more new customization manifest to the updated customization application which had not been included in earlier versions of the customization application. For example, a new customization manifest associated with a recently approved MVNO (e.g., approved by an owner of a radio access network (RAN) comprising the cell site 110) may be added to the updated customization application and stored as an updated customization application in the application data store 116. In some cases, the updated customization application may remove a customization manifest that had been present in a previous version of the customization application, for example when the owner of the RAN comprising the cell site 110 terminates a business agreement with an MVNO associated with the removed customization manifest. In some cases, an updated customization application may be built by removing one or more customization manifest that had been present in a previous version of the customization application and by adding one or more new customization manifest to the updated customization application.

When the installer application detects the updated customization application in the application data store 116, it downloads the updated customization application and installs the updated customization application as the customization application 118 and customization manifests 120 in the memory 106. In this way, updates to the customization application 118 and new customization manifests can be added to the UE 102 without incurring a costly and complicated maintenance release.

In an embodiment, the installer application 114 and the customization application 118 may be stored in a non-transitory portion of the memory 106. In an embodiment, the installer application 114 and the customization application 118 may be stored in a system partition of non-transitory memory in the memory 106.

In an embodiment, the UICC 107 is removable. A first UICC associated with a first MVNO may be removed from the UE 102 and a second UICC associated with a second MVNO may be installed into the UE 102 to switch a subscription account associated with the UE 102 from the first MVNO to the second MVNO. When the customization application 118 detects that a different UICC 107 has been installed into the UE 102, the customization application 118 may execute a customization process. In an embodiment, the customization application 118 is executed by the processor 104 and may subscribe to receive notifications of various events that may occur on the UE 102, for example the event of a new UICC 107 being installed.

The customization application 118 may read a name or other identity of an MVNO and/or an APN from the UICC 107. Alternatively, the customization application 118 may obtain the name or other identity of the MVNO and/or the APN indirectly by some other application or component of the UE 102. The customization application 118 uses the name or other identity of the MVNO and/or the APN to index into the plurality of the customization manifests 120 to select a customization manifest 120 associated with the MVNO.

If the name or other identity of the MVNO and/or the APN does not index to one of the customization manifests 120, this implies the MVNO associated with the UICC 107 is unapproved or is unaffiliated with the owner of the RAN and the customization process aborts. Additionally, the customization application 118 may take action to prevent the UE 102 attempting to establish a wireless communication link with the cell site 110, for example by setting a flag in the memory 106. In an embodiment, the customization application 118 writes into one or more of a plurality of non-volatile (NV) parameters 122 in the memory 106 whereby to indicate or flag that the UE 102 is blocked from attempting to establish a wireless communication link with the cell site 110. In this way, security of the RAN containing the cell site 110 and security of the network 112 can be increased, for example by avoiding UEs 102 having UICCs 107 associated to unapproved and/or unaffiliated MVNOs attaching to the RAN comprising the cell site 110. In an embodiment, the customization application 118 in this scenario may present a notification on a display of the UE 102 announcing that the UICC 107 is associated with an unsupported MVNO and must be replaced with a supported MVNO. The notification may identify a web site or phone number that a user can use to follow up using a different device to identify supported MVNOs.

If, however, the customization application 118 successfully indexes to one of the customization manifests 120, the customization application 118 reads the selected customization manifest 120 and customizes the UE 102 based on the contents of the customization manifest 120. In an embodiment, the customization manifest 120 writes at least some of the contents of the selected customization manifest into the NV parameters 122. The UE 102 executes and presents interfaces to a user at least partly based on the contents of the NV parameters 122.

Each customization manifest 120 may define ring tones, a power-on video, a power-off video, logos, wallpapers, background themes, a home screen, a MVNO home page, carrier applications, roaming plans, email box configuration information, and/or voicemail box configuration information. In an embodiment, the customization manifests 120 each comprise at least 3 elements from the group consisting of a ring tone, a power-on video, a power-off video, a logo, a home screen a reference to a home page, and a roaming plan. Each different MVNO may wish that when its UICC 107 is installed in the UE 102, that the UE 102 provide a user experience—ring tones, power on video, power off video, wall papers, background themes, etc.—that is distinctive for that MVNO. The MVNO may desire that the UE 102 rely upon an email server and a voicemail server associated with the MVNO, and links to this email server and voicemail server may be defined in the customization manifest 120 along with a home page or web site reference associated with the MVNO.

In an embodiment, the customization manifests 120 may each comprise an XML file, and reading from a customization manifest 120 comprises extracting the XML file and writing at least some of the extracted information to the NV parameters 122. The customization of the UE 102 may be construed as optimizing the UE 102 for operation with the MVNO. For example, the customization manifests 120 may define roaming policies and roaming lists associated with the subject MVNO. For example, the customization manifests 120 may define virtually installed applications preferred by the MVNO that are to be installed into a system partition of the memory 106. A virtually installed application may be an interface stub that, when clicked on by a user, may be dynamically downloaded and installed by the installer application 114. For more details on virtually installed applications, see U.S. Pat. No. 9,092,291 published Jul. 28, 2015, entitled "Dynamic Updating and Renaming Virtual Pre-Installation Stub Applications," by Fared A. Adib, et al., U.S. Pat. No. 9,098,366 published Aug. 4, 2015, entitled "Virtual Pre-Installation of Applications," by Fared A. Adib, et al., and U.S. Pat. No. 9,871,905 published Jan. 16, 2018, entitled "Systems and Methods for Customized Delivery of Virtually Installed Applications," by Matthew Habiger, et al., which are all incorporated herein by reference in their entireties. The above customization steps may be performed before the UE 102 attempts to attach to the cell site 110 after the initial installation of the UICC 107.

The customization application 118 may further establish a communication link via the radio transceiver 108, the cell site 110, and the network 112 to a server 124 that executes a service provisioning application 126 in order to complete provisioning wireless communication service with the MVNO. The service provisioning application 126 may store provisioning values in a provisioning data store 128. The RAN associated with the cell site 110 may rely on the provisioning information stored in the provisioning data store 128 to provide wireless communication service to the UE 102 and to support billing services for the MVNO. In addition to completing provisioning actions via the service provisioning application 126, the customization application 118 may further complete a second phase of over-the-air customization via the service provisioning application 126 and/or with a different server or different application accessed via the network 112.

It is understood that the system 100 may comprise any number of UEs 102 and any numbers of cell sites 110. The server 124 may be implemented as a computer system. Computer systems are described further hereinafter.

Figure 2A:
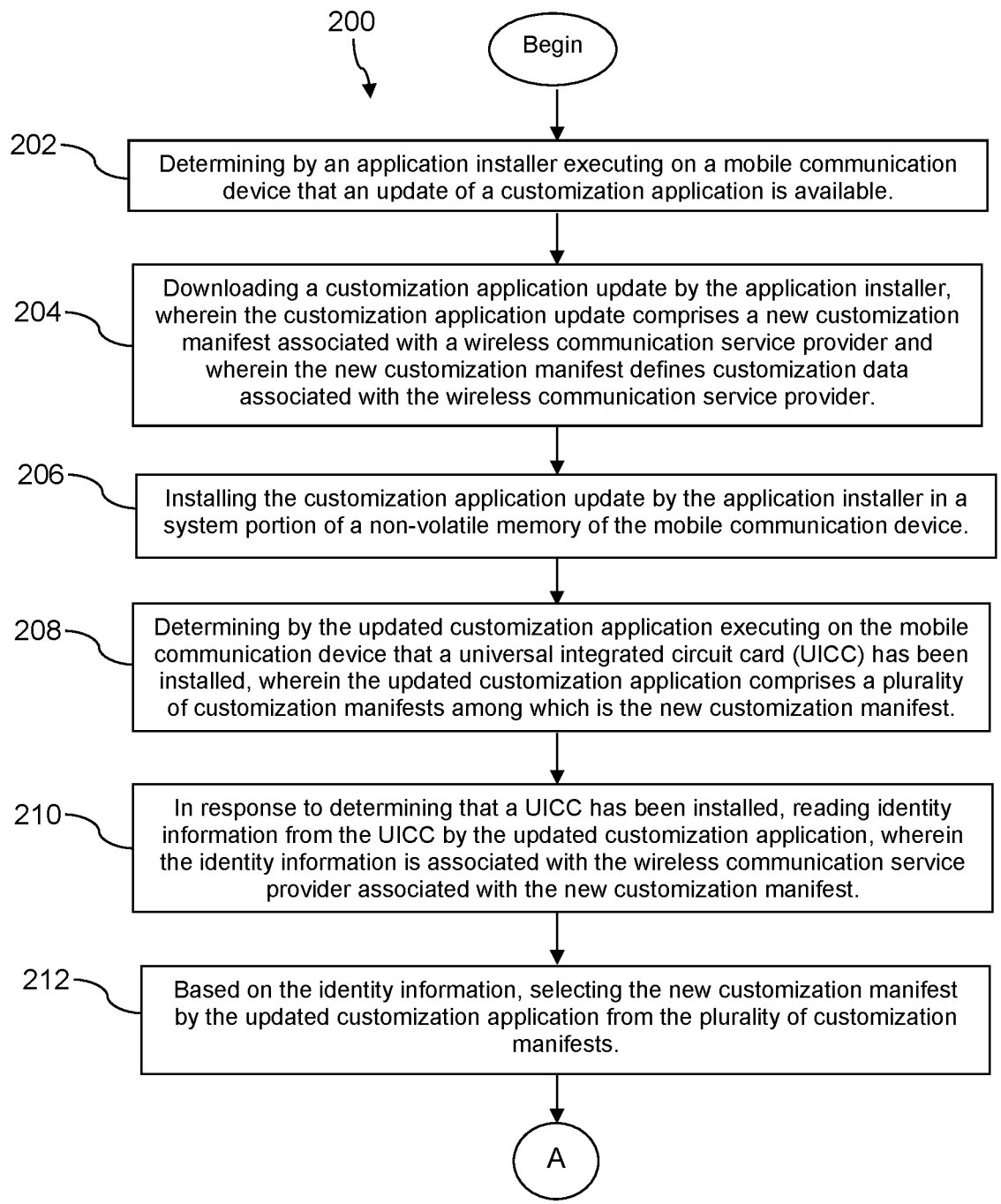
FIG. 2A and FIG. 2B are a flow chart of a method according to an embodiment of the disclosure.
Figure 2B:
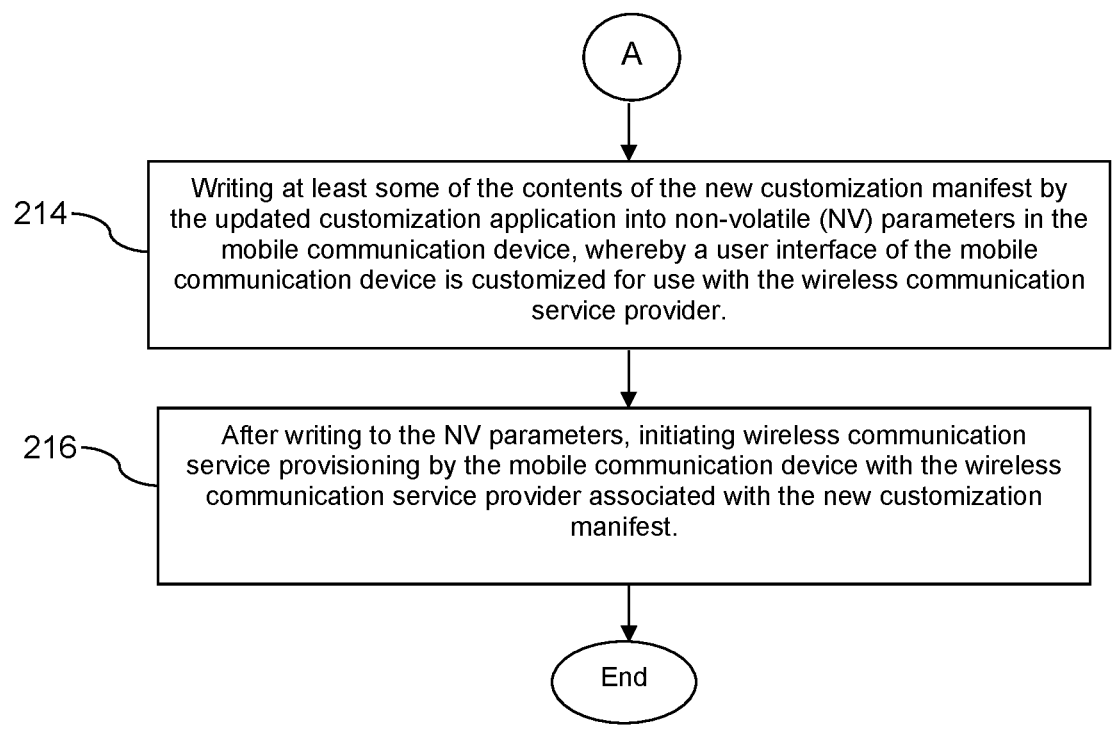

Turning now to FIG. 2A and FIG. 2B, a method 200 is described. In an embodiment, the method 200 may be executed by the processor 104 of the UE 102 described above. In an embodiment, at least some of the actions of the method 200 may be performed by the installer application 114 being executed by the processor 104 and at least some of the actions of the method 200 may be performed by the customization application 118 being executed by the processor 104. In an embodiment, the method 200 is a method of customizing a mobile communication device, for example of customizing the UE 102.

At block 202, the method 200 comprises determining by an application installer executing on a mobile communication device that an update of a customization application is available. At block 204, the method 200 comprises downloading a customization application update by the application installer, wherein the customization application update comprises a new customization manifest associated with a wireless communication service provider and wherein the new customization manifest defines customization data associated with the wireless communication service provider.

At block 206, the method comprises installing the customization application update by the application installer in a system portion of a non-volatile memory of the mobile communication device. At block 208, the method comprises determining by the updated customization application executing on the mobile communication device that a universal integrated circuit card (UICC) has been installed, wherein the updated customization application comprises a plurality of customization manifests among which is the new customization manifest.

At block 210, the method 200 comprises, in response to determining that a UICC has been installed, reading identity information from the UICC by the updated customization application, wherein the identity information is associated with the wireless communication service provider associated with the new customization manifest. At block 212, the method 200 comprises, based on the identity information, selecting the new customization manifest by the updated customization application from the plurality of customization manifests.

At block 214, the method 200 comprises writing at least some of the contents of the new customization manifest by the updated customization application into non-volatile (NV) parameters in the mobile communication device, whereby a user interface of the mobile communication device is customized for use with the wireless communication service provider. In an embodiment, writing at least some of the contents of the new customization manifest into NV parameters occurs before an initial presentation of a user interface on a display of the mobile communication device during power up after the UICC is installed. In an embodiment, method 200 further comprises writing virtually installed applications associated with the wireless communication service provider associated with the new customization manifest into the system portion of the non-volatile memory of the mobile communication device.

At block 216, the method 200 comprises, after writing to the NV parameters, initiating wireless communication service provisioning by the mobile communication device with the wireless communication service provider associated with the new customization manifest.

Figure 3:
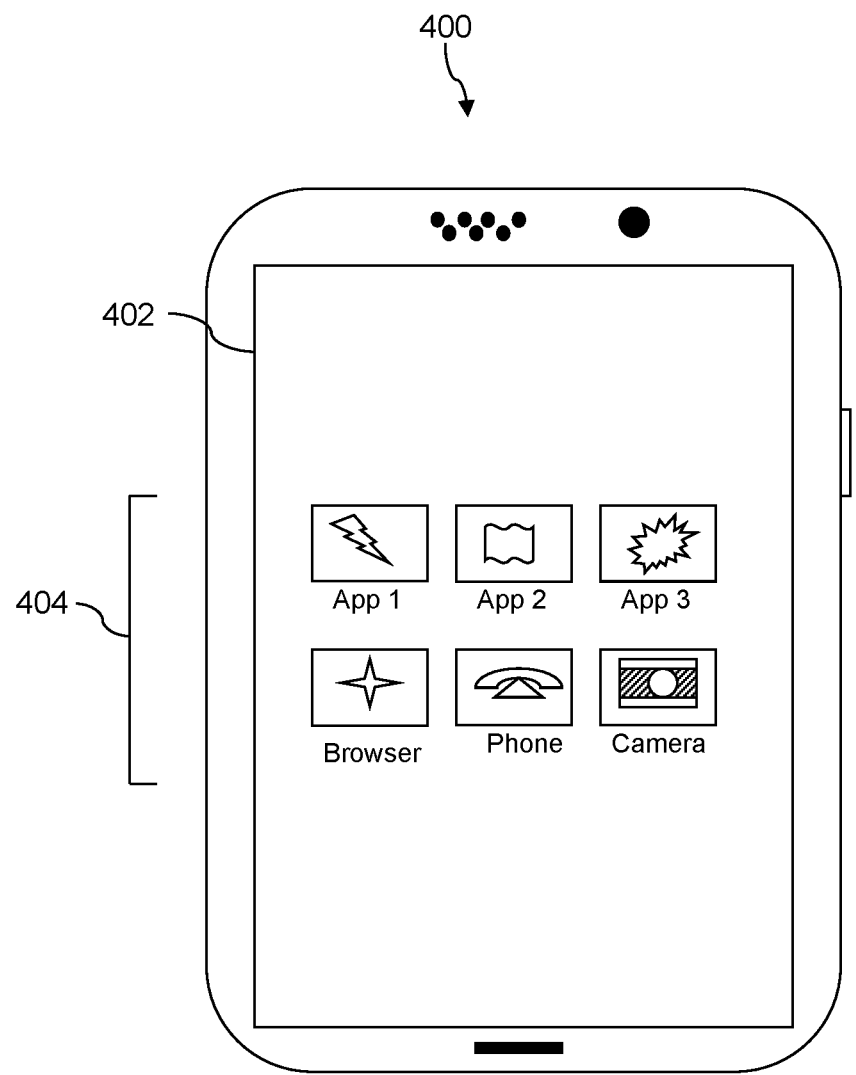
FIG. 3 is an illustration of a mobile communication device according to an embodiment of the disclosure.

FIG. 3 depicts the user equipment (UE) 400, which is operable for implementing aspects of the present disclosure, but the present disclosure should not be limited to these implementations. Some examples of the UE 102, described above, may be implemented in the form of the UE 400 of FIG. 3. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
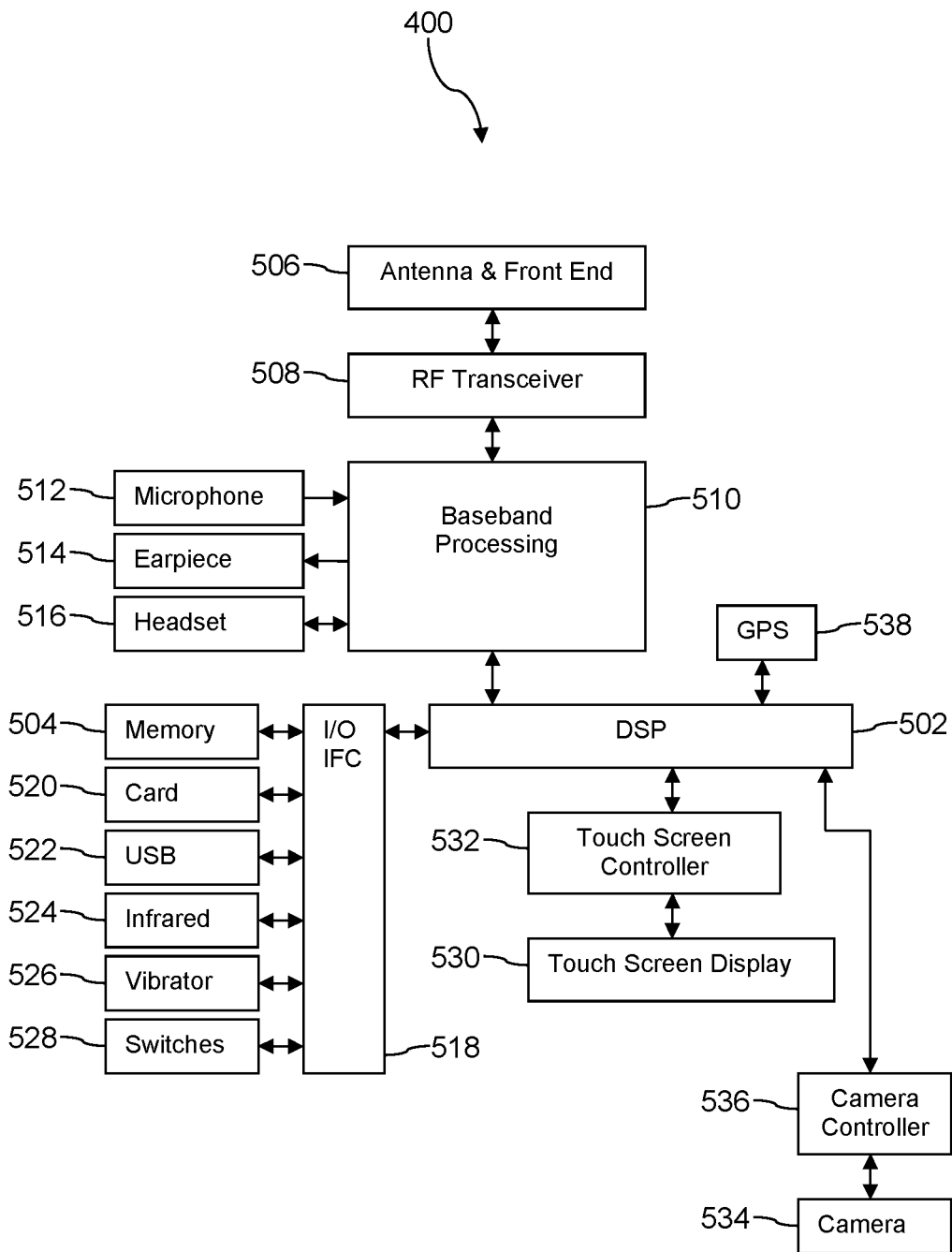
FIG. 4 is a block diagram of a hardware architecture of a mobile communication device according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
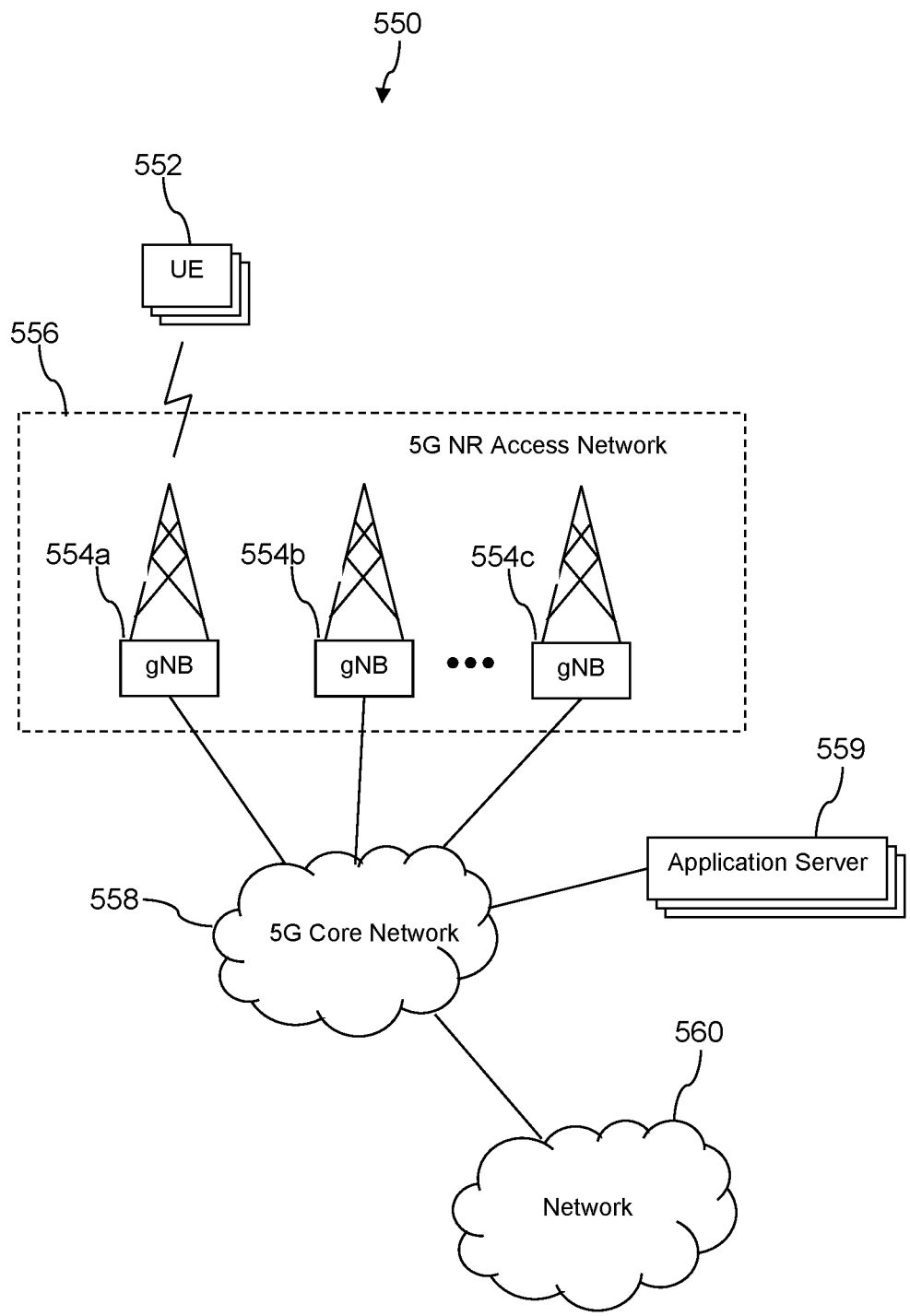
FIG. 5A is a block diagram of an aspect of a communication network according to an embodiment of the disclosure.

Turning now to FIG. 5A, an exemplary communication system 550 is described. Some portions of the communication system 100 may be implemented consistent with the system 550. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
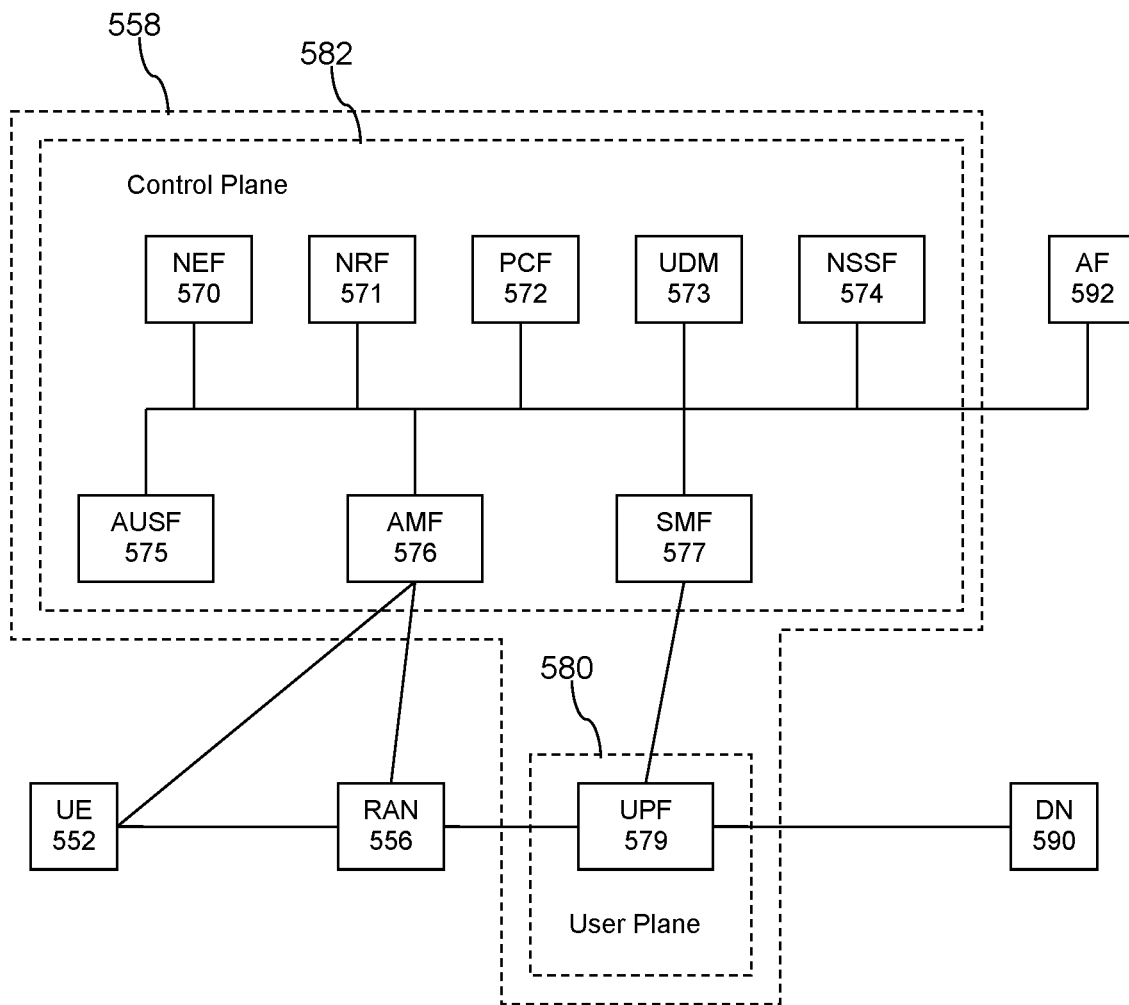
FIG. 5B is a block diagram of another aspect of a communication network according to an embodiment of the disclosure.

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6A:
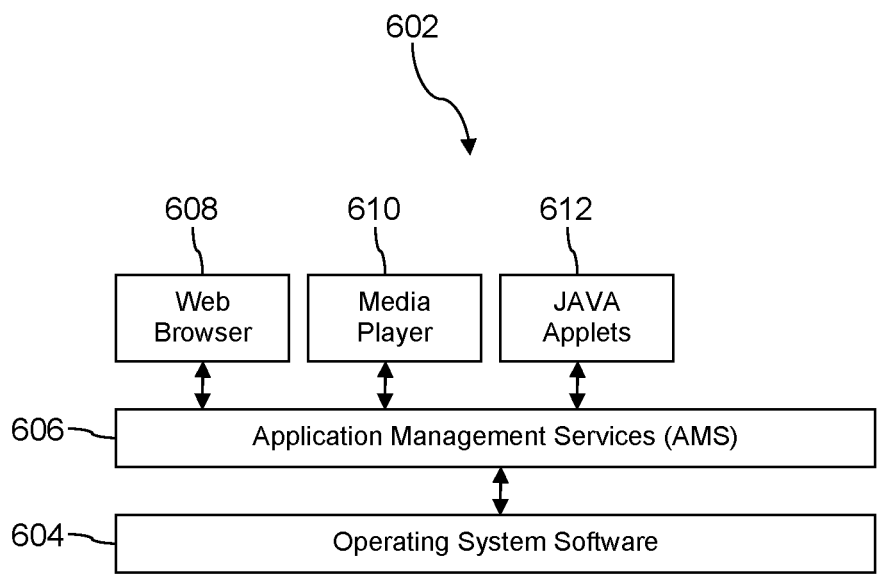
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
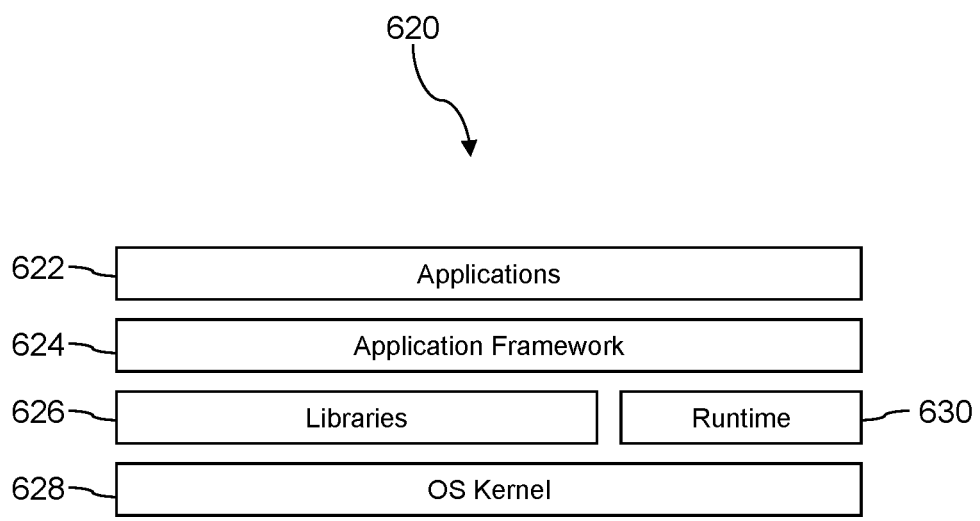
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
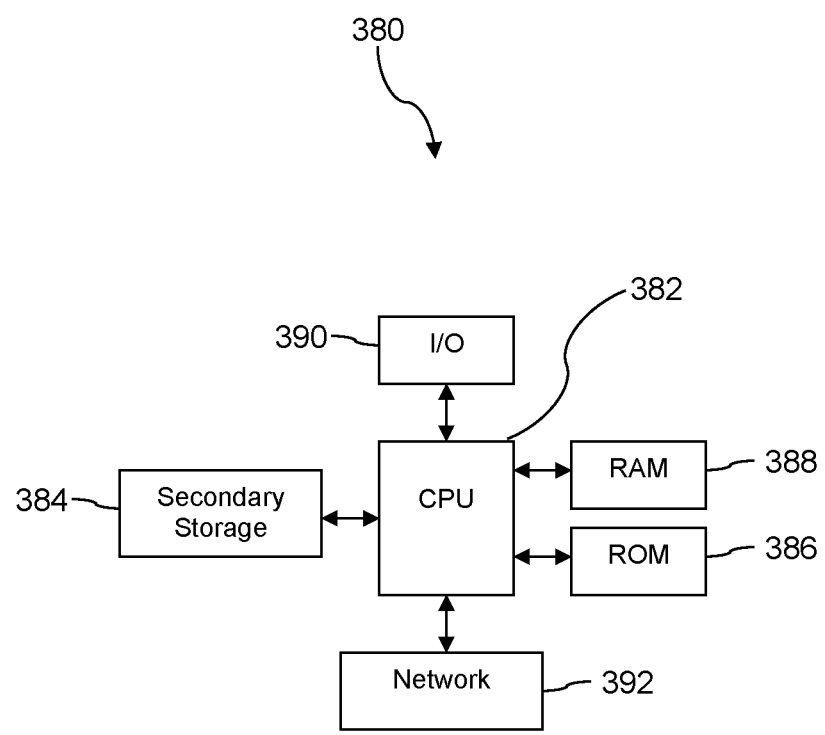
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device that updates wireless communication service provider customization data without maintenance releases and avoids a security risk of granting a temporary communication link for wirelessly downloading customization data in association with a newly installed wireless profile before validating a wireless communication service provider associated with the new wireless profile, comprising:
   a radio transceiver;
   a processor;
   a non-transitory memory;
   an application installer stored in a system portion of the non-transitory memory that, when executed by the processor, automatically downloads updates of applications and installs the updated applications on the mobile communication device; and
   a customization application updated by the application installer and stored in the system portion of the non-transitory memory, wherein the customization application comprises data defining a plurality of customization manifests and comprises instructions that, when executed by the processor,
      determines that a first universal integrated circuit card (UICC) has been installed in the mobile communication device,
      reads first identity information from the first UICC, wherein the first identity information is associated with a first wireless communication service provider,
      based on the first identity information, looks up a first customization manifest that is one of the plurality of customization manifests,
      writes at least some of the contents of the first customization manifest into non-volatile (NV) parameters in the non-transitory memory, whereby a user interface of the mobile communication device is customized for use with the first wireless communication service provider,
      initiates a wireless link to a cell site via the radio transceiver to complete wireless communication service provisioning with the first wireless communication service provider based in part on the NV parameters,
      determines that a second UICC has been installed in the mobile communication device,
      reads second identity information from the second UICC, wherein the second identity information is associated with a second wireless communication service provider, and
      based on the second identity information, determines that the second wireless communication service provider is unsupported, whereby granting a temporary communication link to the second wireless communication service provider is avoided.

2. The mobile communication device of claim 1, wherein the customization manifests defined by the customization application comprise at least three items selected from the group consisting of a ring tone, a power-on video, a power-off video, a logo, a wallpaper, a background theme, a home screen, a reference to a home page, and a roaming plan.

3. The mobile communication device of claim 1, wherein the application installer further determines that an updated customization application is available and downloads the updated customization application from an application data store, wherein the updated customization application comprises a new customization manifest not present in the customization application previously installed on the mobile communication device, and installs the updated customization application into the system portion of the non-transitory memory, whereby the new customization manifest is installed without the mobile communication device undergoing a maintenance release.

4. The mobile communication device of claim 1, wherein the first identity information comprises an identity of a mobile virtual network operator (MVNO) that is the first wireless communication service provider or an access point network (APN) associated with the first wireless communication service provider.

5. The mobile communication device of claim 1, wherein the mobile communication device is a mobile phone, a smart phone, a personal digital assistant (PDA), a wearable computer, a headset computer, a laptop computer, a tablet computer, a notebook computer, or an Internet of things (IoT) device.

6. The mobile communication device of claim 1, wherein the wireless link to the cell site is provided according to a 5G, a long-term evolution (LTE), a code division multiple access (CDMA), or a global system for mobile communications (GSM) telecommunication protocol.

7. The mobile communication device of claim 1, further comprising in response to determining that the second wireless communication service provider is unsupported, presenting a notification on a display of the mobile communication device announcing that the second wireless communication service provider is not supported.

8. A method of customizing a mobile communication device, comprising:
   determining by an application installer executing on a mobile communication device that an update of a customization application is available;
   downloading a customization application update by the application installer, wherein the customization application update comprises a new customization manifest associated with a wireless communication service provider and wherein the new customization manifest defines customization data associated with the wireless communication service provider;

installing the customization application update by the application installer in a system portion of a non-volatile memory of the mobile communication device;

determining by the updated customization application executing on the mobile communication device that a universal integrated circuit card (UICC) has been installed, wherein the updated customization application comprises a plurality of customization manifests among which is the new customization manifest;

in response to determining that a UICC has been installed, reading identity information from the UICC by the updated customization application, wherein the identity information is associated with the wireless communication service provider associated with the new customization manifest;

based on the identity information, selecting the new customization manifest by the updated customization application from the plurality of customization manifests;

writing at least some of the contents of the new customization manifest by the updated customization application into non-volatile (NV) parameters in the mobile communication device, whereby a user interface of the mobile communication device is customized for use with the wireless communication service provider; and after writing to the NV parameters, initiating wireless communication service provisioning by the mobile communication device with the wireless communication service provider associated with the new customization manifest.

9. The method of claim 8, wherein the mobile communication device is a mobile phone, a smart phone, a personal digital assistant (PDA), a wearable computer, a headset computer, a laptop computer, a tablet computer, a notebook computer, or an Internet of things (IoT) device.

10. The method of claim 8, wherein the customization manifests comprise at least three items selected from the group consisting of a ring tone, a power-on video, a power-off video, a logo, a wallpaper, a background theme, a home screen, a reference to a home page, and a roaming plan.

11. The method of claim 8, wherein initiating wireless communication service provisioning comprises establishing a wireless link to a cell site by the mobile communication device according to a 5G, a long-term evolution (LTE), a code division multiple access (CDMA), or a global system for mobile communications (GSM) telecommunication protocol.

12. The method of claim 8, wherein writing at least some of the contents of the new customization manifest into NV parameters occurs before an initial presentation of a user interface on a display of the mobile communication device during power up after the UICC is installed.

13. The method of claim 8, further comprising writing virtually installed applications associated with the wireless communication service provider associated with the new customization manifest into the system portion of the non-volatile memory of the mobile communication device.

14. A mobile communication device that customizes a user interface of the mobile communication device based on a pre-loaded customization manifest, comprising:
a processor;
a non-transitory memory; and
a customization application stored in the non-transitory memory, wherein the customization application comprises data defining a plurality of customization manifests and comprises instructions that, when executed by the processor,
determines that a universal integrated circuit card (UICC) has been installed in the mobile communication device,
reads identity information from the UICC, wherein the identity information is associated with a wireless communication service provider,
based on the identity information, selects a customization manifest that is one of the plurality of customization manifests,
writes at least some of the contents of the selected customization manifest into non-volatile (NV) parameters in the non-transitory memory, whereby a user interface of the mobile communication device is customized for use with the wireless communication service provider, and
after writing some of the contents of the selected customization manifest into NV parameters, completes wireless communication service provisioning with the wireless communication service provider based in part on the NV parameters.

15. The mobile communication device of claim 14, wherein the customization application is stored in a system portion of the non-transitory memory.

16. The mobile communication device of claim 14, wherein the mobile communication device is a mobile phone, a smart phone, a personal digital assistant (PDA), a wearable computer, a headset computer, a laptop computer, a tablet computer, a notebook computer, or an Internet of things (IoT) device.

17. The mobile communication device of claim 14, wherein the customization application completes wireless communication service provisioning via a wireless link to a cell site provided according to a 5G, a long-term evolution (LTE), a code division multiple access (CDMA), or a global system for mobile communications (GSM) telecommunication protocol.

18. The mobile communication device of claim 17, wherein the mobile communication device further comprises a radio transceiver and wherein the wireless link to the cell site is provided by the radio transceiver.

19. The mobile communication device of claim 14, wherein the customization application further
determines that a second UICC has been installed in the mobile communication device,
reads second identity information from the second UICC, wherein the second identity information is associated with a second wireless communication service provider that is not supported by the mobile communication device,
determines that the second identity information does not reference any of the plurality of customization manifests, and
presents a notification on a display of the mobile communication device announcing that the second UICC is not supported.

20. The mobile communication device of claim 18, wherein the customization application avoids establishing a wireless link to a cell site when the second UICC is installed.

* * * * *